Oct. 9, 1956   W. P. OEHLER ET AL   2,765,609
DISK HARROW INCLUDING A WHEEL ATTACHMENT
Filed June 14, 1952   2 Sheets-Sheet 1
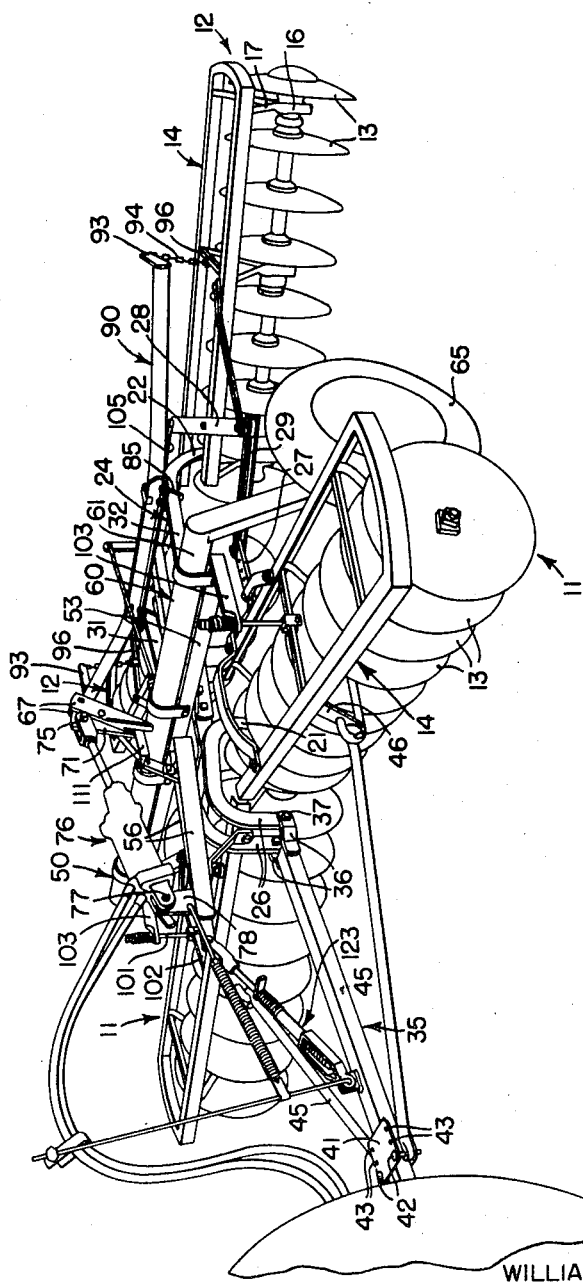
INVENTORS.
WILLIAM P. OEHLER
CHARLES H. YOUNGBERG
LESLIE W. JOHNSON
BY
ATTORNEYS

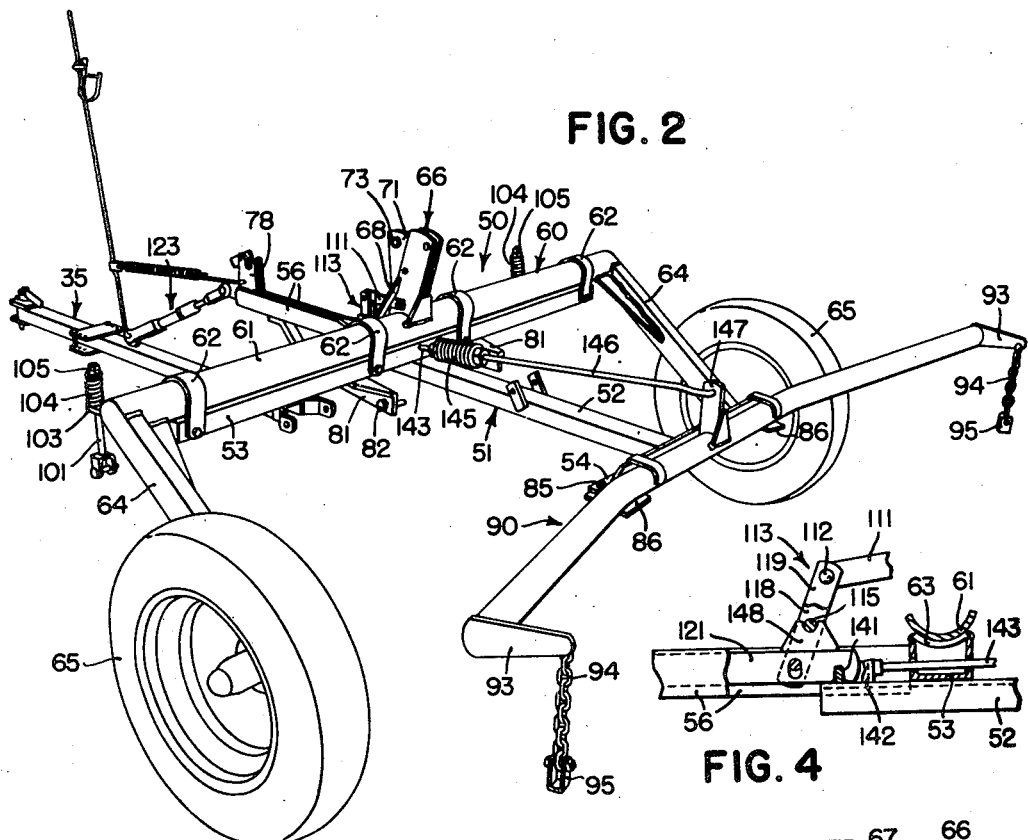

United States Patent Office 2,765,609
Patented Oct. 9, 1956

2,765,609

DISK HARROW INCLUDING A WHEEL ATTACHMENT

William P. Oehler, Charles H. Youngberg and Leslie W. Johnson, Moline, Ill., assignors to Deere & Company, Moline, Ill., a corporation of Illinois Application June 14, 1952, Serial No. 293,612

16 Claims. (Cl. 55—73)

The present invention relates generally to agricultural implements and more particularly to ground-working implements and means associated therewith providing for easy and convenient transport of said implements from place to place, along highways, and the like.

The object and general nature of the present invention is the provision of a wheel-type disk harrow, in which the gangs of the disk harrow remain in the desired angled working position, and generally vertically shiftable ground-engaging wheel means are raised and lowered relative to the harrow frame for the purpose of arranging the disk gangs for operation in the soil, and supporting them above the ground, as for transport or the like. More specifically, it is a feature of this invention to provide a wheel carrier arrangement wherein the several disk gangs are capable of generally up-and-down movement in operation, whereby the implement is especially adapted for uniform operation over uneven terrain, with associated means whereby when the wheels are lowered to support the implement for transport, the outer ends of the gangs are supported and held in a position out of contact with the ground, with ample clearance so that the disks do not gather trash or the like.

These and other objects and advantages of the present invention will be apparent to those skilled in the art after a consideration of the following detailed description, taken in conjunction with the accompanying drawings in which:

Figure 1 is a front quartering perspective view showing a disk harrow and a wheel carrier device therefore, in which the principles of the present invention have been incorporated, the implement being shown in its transport position.

Figure 2 is a rear quartering view of the wheel carrier device, with the disk harrow omitted.

Figure 3 is a fragmentary perspective view showing the details of the power-operated raising and lowering connections, with associated parts.

Figure 4 is a fragmentary detail view showing the motion-transmitting connection between the power actuated wheel raising and lowering means and the part that is connected to raise and lower the hitch or drawbar relative to the harrow frame.

Referring now to the drawings, the present invention has been shown by way of illustration as incorporated in a ground-working machine having flexibly interconnected soil-engaging tool means and a wheeled carrier for supporting the soil-engaging elements out of contact with the ground and in a transport position, thereby facilitating moving the machine from place to place, along roads, highways, lanes and the like, or from one field to another as desired, without changing the operating position of the soil-engaging elements.

As best shown in Figure 1, the soil-engaging elements may take the form of a pair of front disk gangs 11 and a similar pair of rear disk gangs 12. Each disk gang includes a plurality of disks 13 and a gang frame 14 carried on the disks through suitable bearing means 16 and standards or bearing supports 17, one at the outer end of each of the front and rear gangs, and similar bearing means to which front and rear standards 21 and 22, forming a part of the disk harrow main frame 24, are connected. A disk harrow of this general type is well known, one being disclosed in U. S. Patent 2,339,124, issued January 11, 1944, to Charles H. White, to which reference may be made if necessary. The main frame 24 of the harrow includes a forward section having front depending portions 26, rigid with the front part of the frame 24, to which a drawbar or the like may readily be connected. The inner bearings are so constructed and arranged that each gang may swing in a generally horizontal plane as well as in a generally vertical plane relative to the main frame 24 of the harrow. The front and rear gangs 11 and 12 at each side of the machine are interconnected by front and rear angling arms 27 and 28 and an angling link 29, the gangs 12 and 13 being shown in their angled position in Figure 1. The main frame 24, in addition to the forward drawbar-receiving, laterally spaced apart portions 26, also includes generally rigidly interconnected side frame bars 31 and 32.

According to the principles of the present invention, we provide a vertically swingable drawbar 35 and connect it to the forward frame portions 26 through laterally and rearwardly extending apertured lugs 36 and pivot means 37 connecting the lugs to the frame portions 26, whereby the drawbar 35 may swing vertically relative to the frame 24. The front portion of the drawbar 35 carries an apertured plate 41 and pin or bolt means 42, which latter means may be disposed in any pair of selected openings 43 in the plate 41. The bolt or pin means 42 receive the forward ends of angle-controlling links 45, the rear portions of which are connected for vertical and horizontal swinging to brackets 46 carried by the front gang frames 14. By removing the bolts or pins 42 and disposing them in other openings, the angle of the disk gangs, both front and rear, may be changed as desired, and then by replacing the bolts or pins 42, the gangs are held in their position of adjustment, yet each gang may swing generally vertically about its pivotal connection with the associated laterally inner frame bearing member.

For supporting the disk gangs 11 and 12 in a position out of contact with the ground, to provide for easy and convenient transport of the machine, we provide a wheel carrier unit indicated in its entirety by the reference numeral 50. The unit 50 includes a generally centrally disposed main carrier frame 51 that is made up of a longitudinal or fore-and-aft extending inverted channel member 52, a forward transverse frame member 53 which, if desired, may also be in the form of a channel, a rear transverse frame member 54, preferably but not necessarily an angle, both members 53 and 54 being rigidly secured, as by welding, to the fore-and-aft extending frame member 52, and a pair of forward frame bar extensions 56 rigidly connected, as by welding, to the flanges at the forward end of the channel 52.

The forward transverse carrier member 53 is carried on a wheel frame 60 which includes a transverse pipe member 61 supported for rocking movement on the frame bar 53 by inverted U-shaped yokes or straps 62 and associated bearing saddles 63 welded to the flanges of the transverse channel 53. Secured to the ends of the pipe member 61 is a pair of crank arms 64, the lower ends of which carry spindles on which a pair of ground wheels 65 are mounted for rotation. Centrally, the pipe member 61 has an upwardly extending bracket 66 fixed thereto, as by welding, the bracket 66 preferably consisting of a pair of bars or plates 67 and suitable reenforcing gussets 68. The bars 67 are spaced apart a distance sufficient to receive an arm 71 therebetween, the lower end of the arm being mounted for generally fore-and-aft swinging on a pivot member 72 carried in suitable apertures in the lower portions of the bracket plates 67. The upper end of the arm 71 is provided with a transverse sleeve 73 that is adapted to receive the rear pivot pin 75 of an associated hydraulic ram unit 76. The forward end of the unit 76 carries a pivot pin 77 that is adapted to be releasably connected with a bracket 78 extending upwardly at the forward end of the central frame bar extensions 56. The latter bars are fixed in laterally spaced apart relation by suitable separators or the like.

The carrier frame 51 is connected to the forward portion of the harrow frame 24 by means of a pair of angle brackets 81 secured in any suitable way to the underside of the front transverse channel 53 and having their vertical flanges apertured to receive bolts 82 or the like by which the brackets 81 may be fixed to the forward portion of the harrow frame members 31 and 32, preferably where the front harrow frame section is connected therewith. The rear member 54 of the carrier frame 51 is connected to the rear ends of the harrow frame bars 31 and 32 through a pair of U-bolts 85. The U-bolts 85, the upper ends of which extend through apertures in the horizontal flange of the rear angle member 54, also serve to connect bearing plates 86 to the end portion of the angle 54. A rear rockable member 90 is arranged transversely of the carrier frame 51 and is supported by the bearing plates 86 for rocking movement about a generally transverse axis. The rear rockable member 90 is formed as best shown in Figure 2 and at its ends carries rearwardly extending arms 93 from which chains 94 depend. The lower ends of the chains 94 are connected by any suitable means, such as clevises 95, with a member 96 that serves as a crossbar for the associated rear gang frame 14. The chains 94 are thus connected to the generally outer end portions of the rear gangs 12. The laterally outer portions of the front gang 11 are also flexibly connected with the forward portion of the carrier frame 51 through vertically extending links 101, the lower end of each link or rod 101 being pivotally connected with a cross-bar 102 on the associated gang frame 14, and the upper end of each link or rod 101 is slidably disposed in a bracket 103 carried by and projecting forwardly from the laterally outer end portion of the forward channel 53 of the carrier frame 51. A spring 104 disposed about the upper end of each of the links 101 and an adjustable abutment 105, preferably in the form of a lock nut or the like, is provided at the upper end of each link or rod 101 whereby the spring 104 flexibly or resiliently supports the outer end portion of the associated front gang 11, not only when the wheels 65 are lowered for transport, but also when the machine is in operation, thereby preventing the laterally outer ends of the disk gangs from digging in too deeply. The laterally outer ends of the rear gangs 12 do not tend to dig in; instead, the inner ends tend to dig into the soil. However, they are prevented from doing so by suitable spring means, indicated at 105, the details per se of which do not form a part of the present invention. Both the forward disk-supporting means 101 and the rear disk-supporting means 94 provide for up-and-down movement of the outer ends of the front and rear gangs in operation, whereby the implement may be conveniently constructed to work a relatively wide strip of ground and to follow inequalities in the ground surface, working generally at a uniform depth, therefore, irrespective of whether the ground is level or irregular. Normally, the arms 93 occupy a relatively low position so that the chains 94 are generally slack in operation.

For raising and lowering the ground wheels 65, thereby arranging the implement for ground-working or for transport, respectively, the hydraulic unit 76 is connected with the hydraulic power lift unit of the associated propelling tractor (not shown), which is of conventional construction. Extending and retracting the unit 76 causes the pipe member 61 and arms 64 to be rocked in a direction to raise and lower the wheels 65 relative to the harrow and carrier frames 24 and 51. According to the principles of the present invention, the rocking movement of the forward transverse member or wheel frame 60 is transmitted to the rear rockable member 90 so that, when the machine is arranged for transport, all slack is taken out of the chains 94 and the rear ends of the arms 93 are lifted a distance sufficient to carry the outer ends of the rear gangs 12 in a substantially level position. So far as the outer ends of the front gangs are concerned, the springs 104, when the harrow is lifted, have sufficient strength to hold the outer ends of the front gangs in a level position. In operation, the outer ends of both the front and the rear gangs are free to rise and fall, as mentioned above.

According to the principles of the present invention, the rear member 90 is rocked whenever the front member or wheel frame 60 is rocked, as by operation of the power unit 76, by interconnecting or motion-transmitting means which will now be described. Referring first to Figure 3, a link 111 is connected at its rear end with the pivot pin 72 and at its forward end is connected through a pivot pin 112 to the upper end of a lever 113. The latter is supported for rocking movement on fulcrum means 114, preferably consisting of a pin 115 and a pair of angle brackets 116 supporting the pin 115 on the rear portions of the front bars 56. The lower end of the lever 113, which preferably consists of two bars 118 and 119 mounted in side-by-side relation, and apertured at their upper and lower ends, is connected to the rear end of a leveling bar 121 that is supported for sliding movement on the carrier frame in a position between the forward bars 56. The leveling bar 121 extends at its forward end beyond the bracket 78 and is pivotally connected with the front end of the drawbar 35 by a drawbar and leveling adjuster linkage 123. The latter consists of front and rear clevis yokes 125 and 126 and telescopically associated screw-threaded parts 127 and 128, one of which carries a handle 129. The member 127 includes the clevis section 125 and a sleeve portion 131 in which the forward end of the other telescopically associated member 128 is received. A spring 133 is confined between the rear end of the tubular section 131 and the adjusting handle 129, and a similar compression spring 134 is confined between the forward end of the tubular section 131 and a lock nut 136 fixed to the forward end of the member 128. The rear end of the latter member is threaded and adjustably receives the rear swivel yoke 126. Thus, turning the handle section 129 adjusts the effective length of the linkage 123, but in any position of adjustment, the two cushioning springs 133 and 134 provide for relative movement of the linkage parts, whereby the drawbar 35 is adapted to swing vertically through a limited extent even though the leveling bar 121 is held against movement, as by its connection with the wheel frame 60. This permissive movement of the drawbar 35 permits the disk harrow as a whole to tilt on the ground wheels 65 when, in operation, with the front end of the drawbar connected to a tractor, an obstruction, such as a stone, hump or the like is encountered, particularly by the center disks.

The rearmost end of the leveling bar 121 is provided with a notch 141 in which a coupling member 142 is disposed. The coupling member 142 is connected to the front end of a rod 143 that extends through openings in the flanges of the front channel member 53, just above the main channel 52 of the carrier frame. The rear end of the rod 143 is threadedly connected with a coupler 151 connected to the forward end of a cushion spring 145, the rear end of which is connected by a similar coupling member 151 to a rear rod 146, the rear end of which rod is pivotally connected to an arm 147 that is fixed rigidly, as by welding, to the central portion of the rear rockable member 90. The notched end of the leveling bar 121 is maintained in operative connection with the coupler 142 by means of a hold-down bearing block 148 that overlies the rear end of the bar 121 and is notched at its upper side to receive the pivot pin 115, the latter thus holding the member 148 against fore-and-aft displacement. Lock nuts may be provided, if necessary, to maintain the rods 143 and 146 in adjustment relative to the associated coupling members 151.

As best shown in Figure 2, which shows the parts of the wheel carrier for a disk harrow, the carrier frame 51 may readily be connected to the frame 24 of the disk harrow by the forward bolts 82 and the rear U-bolts 85. The drawbar 35 may readily be connected to the front sections 26 of the harrow frame, and then by connecting the angle-controlling rods 45 to the front bearings, both the front and rear gangs are held in the selected position of angle. The lower ends of the lift rods or links 101 are connected with the outer end portions of the front gangs 11 and the rear lift links 94 are connected with the outer end portions of the rear gangs 12 by the clevises 95. By then installing the power lift unit 76, which normally is a part of the propelling tractor, the implement is ready for use.

In operation, by extending the hydraulic unit 76, the wheels 65 may be lowered so as to raise the harrow frame and the associated gangs into their transport position. The clockwise rotation (as viewed in Figure 3) of the pipe member 61 acts through the lever 113 and associated parts to rock the rear transverse member 90 in a counterclockwise direction, thus lifting up through the links 94 on the outer ends of the rear gangs. When the implement reaches the field to be disked, the hydraulic unit 76 is retracted and the wheels 65 raised, thus permitting the disks to enter the ground. If the ground is quite soft, the wheels 65 may be rocked into a position to serve as gauge wheels contacting the ground and serving to limit the depth of operation. If the ground is hard, the wheels 65 may be raised into an upper position, in which the weight of the wheels is added to the implement, thus assisting in securing proper penetration.

While we have shown and described above the preferred structure in which the principles of the present invention have been incorporated, it is to be understood that our invention is not to be limited to the particular means shown and described above, but that, in fact, widely different means may be employed in the practice of the broader aspects of our invention.

What we claim, therefore, and desire to secure by Letters Patent is:

1. A disk harrow comprising a frame, a pair of disk gangs pivotally connected with said frame for generally up-and-down swinging, a pair of ground wheels movable generally vertically relative to said frame, means connected to act between said frame and said wheels for raising said frame relative to said wheels, and means connected with said raising means for raising the swingable ends of said gangs relative to said frame when the latter is raised relative to said ground wheels.

2. A disk harrow comprising frame means, pairs of front and rear gangs supported at their inner ends by said frame means, ground-engaging wheels movably connected with said frame means, means connected to act between said frame and said wheels for raising and lowering said frame means relative to said frame means, and means connected with said raising and lowering means and the outer ends of the rear gangs for lifting upwardly on the outer ends of the rear gangs to raise said outer ends relative to the frame means and the inner ends of the gangs when said frame means is raised relative to said ground wheels.

3. A disk harrow comprising frame means, pairs of front and rear gangs supported at their inner ends by said frame means, ground-engaging wheels movably connected with said frame means, means connected to act between said frame means and said wheels for raising and lowering said ground wheels relative to said frame means, means connecting the outer ends of said front gangs with said frame means, a member rockably mounted on the rear portion of said frame means and including crank-like ends operatively connected with the outer ends of said rear gangs, and means connected with said member and said raising and lowering means for raising and lowering the outer ends of said rear gangs relative to said frame means whenever said ground wheels are raised and lowered.

4. A disk harrow comprising frame means, pairs of front and rear gangs supported at their inner ends by said frame means for generally vertical swinging movement relative thereto, a transverse member secured to said frame means and extending generally laterally outwardly thereof above said front gangs, means at the outer ends of said transverse members for supporting the outer ends of the front gangs for limited relative movement in a vertical direction, a second transverse member journaled for rocking movement on the rear portion of said frame means and having connections at its ends with the outer portions of said rear gangs, ground-engaging wheels movably connected with said frame means, means connected between said frame means and ground wheels for raising and lowering said ground wheels relative to said frame means, and means connected with said raising and lowering means and operated thereby for rocking said rockably mounted member and the outer ends of said rear gangs.

5. A disk harrow comprising a main frame, pairs of front and rear disk gangs pivotally connected at their inner ends for both generally vertical and generally horizontal swinging, means at each side of the main frame between the front and rear gangs at each side for interconnecting said gangs, a drawbar connected with the front ends of said main frame, angle-control links connected at their rear outer ends with the outer ends of said front gangs, means adjustably connecting the front ends of said links with said drawbar for fixing the angle at which said front and rear gangs operate, a wheel carrier comprising a carrier frame, means detachably connecting said carrier frame with said main frame, a wheel frame rockably journaled on said carrier frame and including a pair of wheel-receiving arms, ground wheels journaled on said arms and disposed between said front and rear gangs, a transport yoke rockably mounted on the rear end of said carrier frame and including arm means having a lifting connection with the outer ends of said rear gangs, a lifting connection between the forward portion of said carrier frame and the outer ends of said front gangs, means acting between and connected with said carrier frame and said rockable wheel frame, and motion-transmitting means interconnecting said wheel frame and said rockable yoke, and motion-transmitting means connecting the forward end of said drawbar and said rockable wheel frame.

6. A wheel carrier for disk harrows of the type including a frame, pairs of front and rear gangs, and means connecting the inner ends of said gangs for generally vertical swinging relative to said frame, said carrier comprising a carrier frame, means for connecting said frames, ground wheels movably connected with said carrier frame, means connected to act between said wheels and carrier frame for raising and lowering said wheels relative to said carrier frame, means on said carrier frame for connecting said carrier frame with the outer ends of said front gangs for limited vertical movement relative thereto, a member supported transversely on the rear portion of said carrier frame for rocking movement, means at the ends of said rockable transverse member for connecting the outer ends of said rear gangs to said rockable transverse member, and means connecting said rockable member with said wheel raising and lowering means whereby operation of the latter serves to raise the outer ends of said rear gangs through said rockable member.

7. A wheel carrier for disk harrows of the type including pairs of front and rear gangs and frame means to which the inner ends of said gangs are connected, said carrier comprising a carrier frame, means for fixing the latter frame to said frame means, ground-engaging means movably connected with said carrier frame and adapted when lowered to support said frame and frame means in a transport position, front and rear means carried by said carrier frame and connected with the outer ends of said front and rear gangs, respectively, for supporting said outer ends when said frame means is raised, one of said front and rear means being movable, means connected with said ground-engaging means for raising and lowering the latter, and means connected with said latter means for moving said one means.

8. A wheel carrier for disk harrows of the type including pairs of front and rear gangs and frame means to which the inner ends of said gangs are connected, said carrier comprising a carrier frame, means for fixing the latter frame to said frame means, ground-engaging means movably connected with said carrier frame and adapted when lowered to support said frame and frame means in a transport position, front and rear means carried by said carrier frame and connected with the outer ends of said front and rear gangs, respectively, for supporting said outer ends when said frame means is raised, one of said front and rear means being movable, means connected with said ground-engaging means for raising and lowering the latter, and means connected with said latter means for moving said one means, said last-mentioned means including a part mounted on said carrier frame for fore-and-aft movement relative thereto, a drawbar connected for generally vertical swinging with said frame means, and a leveling member connected between said part and said drawbar.

9. A carrier for agricultural implements having ground-working means spaced apart in a generally fore-and-aft direction, said carrier comprising a carrier frame adapted to receive said tool means for generally vertical movement relative thereto, ground-contacting means connected with said carrier frame to support the latter, a forward rockable member journaled for rocking movement about a generally transverse axis on said carrier frame and including crank-like ends disposed between said fore-and-aft spaced apart tool means, a rear rockable member supported for rocking movement about a generally transverse axis on the rear portion of said carrier frame, means yieldably supporting the front tool means from the forward portion of said carrier frame, a lost-motion means connecting the outer ends of said rear rockable member with the outer portions of the rear tool means, and common means for rocking said front and rear rockable members.

10. The invention set forth in claim 9, further characterized by a drawbar adapted to be attached to the forward portion of said implement for generally vertical swinging relative thereto, and means connected with said common means and the forward portion of said drawbar for swinging the latter vertically when said front and rear rockable members are rocked.

11. In a wheel carrier for an agricultural implement, such as a disk harrow or the like, a carrier frame including a longitudinally extending member and a transversely extending member rigidly connected together, a transverse wheel-carrying member mounted for rocking movement on said transverse member, a transverse implement-supporting member mounted for rocking movement about a transverse axis adjacent the rear end of said longitudinally extending member, and a generally fore-and-aft extending motion-transmitting member connecting said transverse rockable members.

12. In a wheel carrier for an agricultural implement, such as a disk harrow or the like, a carrier frame including a longitudinally extending member and a transversely extending member rigidly connected together, a transverse wheel-carrying member mounted for rocking movement on said transverse member, a transverse implement-supporting member mounted for rocking movement about a transverse axis adjacent the rear end of said longitudinally extending member, and a generally fore-and-aft extending motion-transmitting member connecting said transverse rockable members, said fore-and-aft extending member extending forwardly beyond said transverse carrier frame member, a part extending forwardly from said transverse rockable member, means connecting the latter member with the rear portion of said part, and a leveling drawbar connected for vertical swinging movement by fore-and-aft movement of said part.

13. In a wheel carrier for an agricultural implement, such as a disk harrow or the like, a carrier frame including a longitudinally extending member and a transversely extending member rigidly connected together, a transverse wheel-carrying member mounted for rocking movement on said transverse member, a transverse implement-supporting member mounted for rocking movement about a transverse axis adjacent the rear end of said longitudinally extending member, and a generally fore-and-aft extending motion-transmitting member connecting said transverse rockable members, a drawbar-operating part carried for generally fore-and-aft movement on the forward portion of said longitudinal carrier frame member, and motion-transmitting means connecting the rear portion of said drawbar-operating part with said forward transverse rockable member, whereby rocking movement of the latter is transmitted to said fore-and-aft movable part.

14. The invention set forth in claim 13, wherein said motion-transmitting means includes a generally vertically disposed lever connected at its upper end with said forward rockable transverse member, fulcrum means mounted on said longitudinally extending carrier frame member, said drawbar-operating member extending along said longitudinally extending carrier frame member underneath said fulcrum means, means connecting the lower end of said member with said drawbar-operating part, and means connected with said fulcrum means and acting against the rear portion of said drawbar-operating part for holding the latter in position relative to said longitudinally extending carrier member.

15. A disk harrow comprising a rigid frame, a plurality of gangs flexibly connected with said frame, generally vertically movable ground wheels connected with said frame, means connected to act between said frame and said ground wheels to raise and lower the wheels relative thereto so as to lower and raise said frame and disk gangs relative to the ground, a generally transverse rigid member carried by said frame generally over one pair of said gangs and extending laterally outwardly of said rigid frame, a wheel frame structure rockably mounted on said transverse rigid member and carrying said ground wheels, and means supporting said gangs from said frame when said ground wheels are lowered a distance sufficient to raise said gangs off the ground, said supporting means comprising a connection individual to each gang and connecting each gang, independently of the other gangs, with said rigid frame, the supporting means for the gangs of said one pair being carried by the outer end portions of said wheel frame receiving transverse rigid member, said individual connections being constructed and arranged to provide for floating movement of said gangs relative to the frame when the latter is lowered and said wheels are raised.

16. A disk harrow comprising a generally fore-and-aft extending rigid frame, pairs of front and rear gangs connected at their inner end portions with said frame at points spaced apart in a fore-and-aft direction on the frame, for generally vertical swinging relative to the frame, a transverse structure carried by the forward portion of said rigid frame, a wheel frame swingably connected with said transverse structure and including a transverse member rockably mounted on said transverse structure and crank arms fixed to the ends of said transverse member and extending downwardly and rearwardly to points between the front and rear gangs, ground wheels on said arms, an upstanding arm connected at its lower portion to the generally central portion of said transverse member, an extension connected in substantially vertical relation with said rigid frame, a ram unit operatively connected between said extension forward of said rockable transverse member and said arm for raising and lowering said wheels relative to said rigid frame, and means supporting the outer ends of said gangs from said rigid frame when said ground wheels are lowered a distance sufficient to raise said gangs off the ground, said supporting means comprising a connection individual to each gang and connecting each gang, independently of the other gangs, with said rigid frame, the connections for the outer ends of the front gangs being carried by the outer portions of said transverse wheel frame receiving structure.

References Cited in the file of this patent

UNITED STATES PATENTS

| | | |
|---|---|---|
| 2,320,624 | Love | June 1, 1943 |
| 2,320,742 | Newkirk | June 1, 1943 |
| 2,402,884 | Gier | June 25, 1946 |
| 2,469,622 | Acton | May 10, 1949 |
| 2,611,309 | Crain | Sept. 23, 1952 |
| 2,614,377 | Oehler | Oct. 21, 1952 |
| 2,617,342 | Meissner | Nov. 11, 1952 |
| 2,621,458 | Douyard | Dec. 16, 1952 |
| 2,667,724 | Johnson et al. | Feb. 2, 1954 |

FOREIGN PATENTS

| | | |
|---|---|---|
| 77,400 | Norway | Sept. 18, 1950 |